United States Patent [19]

Ohshima et al.

[11] Patent Number: 5,763,345

[45] Date of Patent: Jun. 9, 1998

[54] SYNTHETIC CLAY FOR CERAMICS AND PROCESS FOR PRODUCTION THEREOF

[75] Inventors: Iemitsu Ohshima; Akira Kikuhata. both of Tokyo, Japan

[73] Assignee: Cosmo Clay & Ceramics Co., Ltd., Tokyo, Japan

[21] Appl. No.: 809,655

[22] PCT Filed: Jul. 22, 1996

[86] PCT No.: PCT/JP96/02043

§ 371 Date: May 2, 1997

§ 102(e) Date: May 2, 1997

[87] PCT Pub. No.: WO97/06117

PCT Pub. Date: Feb. 20, 1997

[30] Foreign Application Priority Data

Aug. 4, 1995 [JP] Japan ................... 7-199600

[51] Int. Cl.$^6$ .................................. C04B 33/00
[52] U.S. Cl. .................... 501/129; 501/130; 501/131; 501/141; 501/153; 501/154
[58] Field of Search ................... 501/131, 141, 501/129, 130, 153, 154; 106/DIG. 4

[56] References Cited

U.S. PATENT DOCUMENTS 4,111,868  9/1978  Ficken .......................... 524/53
5,026,744  6/1991  Callandar ...................... 524/27
5,304,706  4/1994  Hooykaas ...................... 588/252

FOREIGN PATENT DOCUMENTS 50-12446    5/1975   Japan .
61-236649  10/1986   Japan .
2-212358    8/1990   Japan .

OTHER PUBLICATIONS

JAPIO Abstract No. JP402157116A which is an abstract of Japanese Patent Specification No. 2-157116 (Jun. 1990).

*Primary Examiner*—Anthony Green
*Attorney, Agent, or Firm*—Kanesaka & Takeuchi

[57] ABSTRACT

A synthetic clay for ceramics is formed of 30–65 wt % of amorphous silica, 30–65 wt % of alumina trihydrate, and 2–20 wt % of at least one element selected from a group consisting of sepiolite, palygorskite, and bentonite. The clay may have a slurry form, partially dehydrated form, or mass or dry powder. The synthetic clay is comparable or even superior to natural clay in plasticity, water retentivity and capability of forming water film. The synthetic lay is useful for ceramic industry or pottery.

10 Claims, 3 Drawing Sheets

SYNTHETIC CLAY FOR CERAMICS AND PROCESS FOR PRODUCTION THEREOF

TECHNICAL FIELD

The present invention relates to a synthetic clay for ceramics and a process for production thereof.

BACKGROUND ART

Pottery is generally defined as any ware produced from silicate and alumina, as the main constituent, and feldspar, sericite, talc, etc. as the accessory constituent, which contain alkali metals and alkaline earth metals, by mixing, forming, glazing, and sintering at a prescribed temperature (1250°–1450° C.). Porcelain clay used for pottery is composed of silicastone, feldspar, and clay, the first containing silicate, the second containing alkali metals, alumina, and silicate, and the third containing alumina and silicate, respectively as their main constituents. It plays an important role in forming. In other words, silicastone, feldspar, and clay are the three major elements constituting pottery. Clay should ideally have a high degree of plasticity and be free of impurities. Plasticity makes clay formable and permits clay to be easily formed by machine into complicated shape with high precision. Unfortunately, naturally-occurring clay of high quality is being exhausted rapidly in recent years.

Natural clay, on the other hand, has some drawbacks. It has an average grain size of 0.5–2.0 μm after purification. This grain size is not necessarily satisfactory for clay's formability (such as mobility and ductility) and green strength. In addition, natural clay contains iron-containing minerals and titanium-containing minerals and organic matters. Upon firing, these minerals develop an undesirable color which impairs the whiteness of fired ware. It is practically impossible to remove these impurities by elutriation and chemical treatment without deteriorating the characteristic properties of clay. Any treatment makes the resulting clay unstable. In the case where treatment involves a coagulant, the resulting clay needs a large amount of peptizer at the time of its use. Another disadvantage of natural clay for ceramics is that it is subject to shrinkage which varies in directions. This is because clay mineral is composed of crystalline particles of definite shape (platy or columnar), and such crystalline particles orient in the direction of pressure under shearing stress. The directionally variable shrinkage reduces the dimensional accuracy of the product.

The present invention was completed to address the above-mentioned problems involved in natural clay. It is an object of the present invention to provide a synthetic clay for ceramics which is characterized by small grain size (below 0.4 μm which is the minimum grain size of natural clay), good water retentivity, ability to form a large amount of water film, low content of iron and titanium, freedom from particle orientation, good dimensional accuracy, and improved sinterability due to high activity. It is another object of the present invention to provide a process for producing a synthetic clay for ceramics in a simple, easy manner without requiring any harmful additive.

DISCLOSURE OF THE INVENTION

The gist of the present invention resides in a synthetic clay for ceramics which comprises 30–65 wt % of fine amorphous silica, 30–65 wt % of alumina trihydrate, and 2–20 wt % of any one or more species of sepiolite, palygorskite, and bentonite.

The amorphous silica should preferably be fumed silica. The alumina trihydrate should preferably be aluminum hydroxide. Of the three materials as the third component, sepiolite is most desirable. The third component is intended to impart viscosity to the synthetic clay.

According to the present invention, the synthetic clay is produced by a process which comprises preparing slurries from respective raw materials by wet milling and then mixing them together such that the resulting product contains, excluding water, 30–65 wt % of amorphous silica, 30–65 wt % of alumina trihydrate, and 2–20 wt % of any one or more species of sepiolite, palygorskite, and bentonite. The thus obtained slurry may undergo partial dehydration to give a water-containing clay. The water-containing clay may further undergo drying to give a clay in the form of mass or dry powder.

The synthetic clay of the present invention is especially suitable for pottery production, and it yields pottery superior in properties to that produced from natural clay.

Of the three major constituents of pottery, silica-stone and feldspar of good quality are ubiquitous, whereas clay of good quality is unevenly distributed and is being exhausted in some areas. The synthetic clay of the present invention will solve this problem and permits production of a variety of pottery. It makes it possible to produce pottery with desired composition and properties and to improve the conventional manufacturing process and its productivity.

The synthetic clay of the present invention is composed of fine particles whose average diameter is smaller than 0.4 μm. This particle diameter is smaller than that of natural clay. Therefore, it is superior in water retentivity and capable of forming a large amount of water film. These properties lead to smooth mobility, uniform molding density, and a minimum deformation due to drying and firing.

The synthetic clay of the present invention is characterized by an extremely low content of iron and a trace amount of titanium, and hence it yields pottery with a high degree of whiteness. Moreover, it is composed of two components, one in the form of fine spheres and the other in the form of fine fibers. This composition prevents particles from becoming orientated at the time of molding. The absence of orientation leads to a high dimensional accuracy in the finished product.

Since the synthetic clay of the present invention is composed of fine particles, sintering can be made at lower temperature in a broader range than natural clay. In addition, it yields pottery which suffers less firing deformation and has an improved mechanical strength.

BEST MODE FOR CARRYING OUT THE INVENTION

Figure 1:
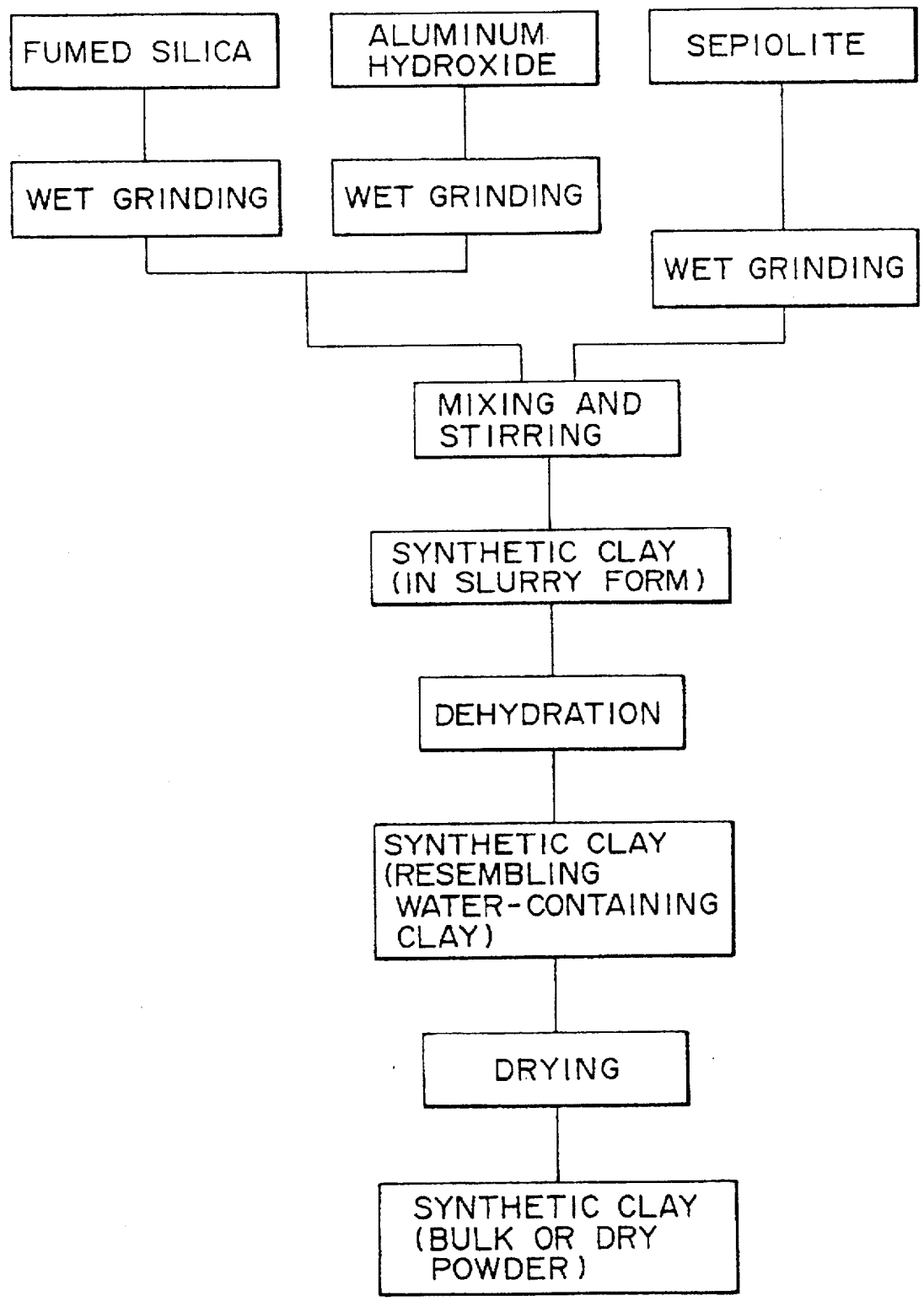
FIG. 1 is a block diagram showing a process of producing a synthetic clay according to the present invention.

The synthetic clay of the present invention is composed of amorphous silica, alumina trihydrate, and a third component which imparts viscosity to the synthetic clay. The third component is one or more species selected from sepiolite, palygorskite, and bentonite.

According to the present invention, the constituent of the synthetic clay is finer than that of natural clay. The fine amorphous silica, as the source of silicate, may be either fumed silica or diatomaceous earth, with the former being preferable. Fumed silica is high-purity amorphous silica in the form of spherical particles, with an average particle diameter smaller than 0.2 µm. A by-product collected from the electric furnace in the production of metallic silicon or ferrosilicon may be used as fumed silica.

According to the present invention, the amount of amorphous silica in the synthetic clay is 30–65 wt %. With an amount less than 30 wt %, amorphous silica contributes to ceramic products which do not have a desired strength (a flexural strength higher than 800 kgf/cm$^2$) due to insufficient sintering. Conversely, with an amount in excess of 65 wt %, amorphous silica contributes to ceramic products which are liable to deformation during firing due to a large quantity of glass phase. A desirable amount of amorphous silica is 33–42 wt %.

Alumina trihydrate as the second component of the synthetic clay is aluminum hydroxide. Aluminum hydroxide is very soft (Mohs hardness=3), has a specific gravity of 2.4, and contains 65% of $Al_2O_3$ and 35% of water. The amount of alumina trihydrate in the synthetic clay should be 30–65 wt %. With an amount less than 30 wt %, the resulting synthetic clay will have a narrow range of firing temperature. With an amount in excess of 65 wt %, the resulting synthetic clay will need a high firing temperature for vitrification and hence the resulting ceramic product will not have a desired flexural strength higher than 800 kgf/cm$^2$. A desirable amount of alumina trihydrate is 52–62 wt %.

The above-mentioned two components (amorphous silica and alumina trihydrate) do not have viscosity so that a third component is added to impart viscosity to them. The third component is one or more species selected from sepiolite, palygorskite, and bentonite. They have the double-chain crystal-line structure. Of these three members, sepiolite is most desirable. Sepiolite functions as a water retainer (or a water content adjuster), a water film forming agent, and a binder. It is a magnesium silicate composed mainly of MgO and $SiO_2$. It is composed of minute particles, each resembling a bundle of fine fibers, 0.2–2.0 µm long. It readily disperses into water and exhibits good water-retention characteristics.

Sepiolite, palygorskite, and bentonite are all so soft that they can be easily pulverized by continuous application of impact and friction in water with the aid of an adequate mill such as ball mill and sand mill. (In the case of sepiolite, pulverizing separates each particle into individual fibers.) Pulverizing gives rise to a very stable paste. The amount of the third component in the synthetic clay should be 2–20 wt %. With an amount less than 2 wt %, the resulting clay is poor in moldability. With an amount in excess of 20 wt %, the resulting clay needs a large amount of water for plasticity, which leads to poor dimensional accuracy due to shrinkage, cracking, distortion, and twisting that occur during drying and firing. A desirable amount of the viscosity-imparting material is 4–12 wt %.

Preferred three components for the synthetic clay are fumed silica, aluminum hydroxide, and sepiolite. Their analytical data are shown in Table 1. The analytical data of the synthetic clay are shown in Table 2 together with those of New Zealand kaolin and Gaerome clay.

The synthetic clay of the present invention is produced by the procedure shown in FIG. 1. Production from fumed silica, aluminum hydroxide, and sepiolite involves the following steps. First, each of the three raw materials is pulverized by wet process to give a slurry. Any known pulverizer such as ball mill can be used for this purpose. The pulverized raw material has an average particle diameter smaller than 0.4 µm. The solid content in each slurry should preferably be 10–40 wt %, 20–60 wt %, and 1–30 wt %, respectively for fumed silica, aluminum hydroxide, and sepiolite.

The slurries of fumed silica and aluminum hydroxide are mixed together, and then the resulting mixture is mixed with the slurry of sepiolite. Alternatively, it is also possible to mix the three slurries together all at once. The resulting slurry thus obtained contains particles having an average diameter smaller than 0.4 µm.

Finally, the slurry is partially dehydrated to give the desired synthetic clay which resembles water-containing clay. Upon drying, the synthetic clay turns into a mass or powder of clay.

The synthetic clay of the present invention has a chemical composition similar to that of kaolinite as a typical constituent of natural clay.

Figure 2:
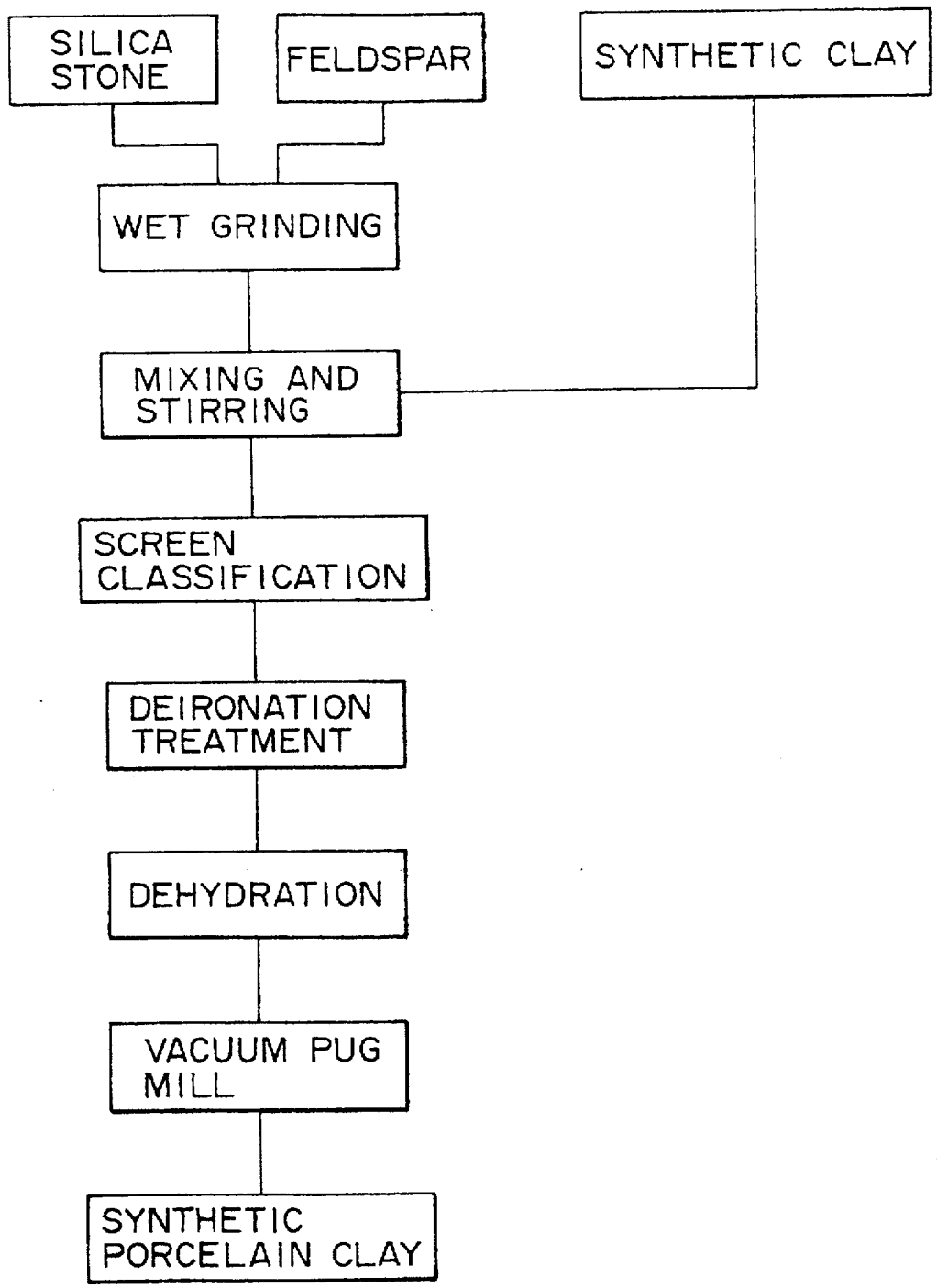
FIG. 2 is a block diagram showing a process for producing a porcelain clay from the synthetic clay of the present invention.

The synthetic clay of the present invention may be made into a synthetic porcelain clay according to the procedure shown in FIG. 2. First, a raw material mixture composed of silicastone (20–50 wt %) and feldspar (10–40 wt %) is pulverized by wet process to give a slurry. This slurry is uniformly mixed with the synthetic clay of the present invention in an amount of 20–40 wt % (on dry basis). The resulting mixture is screened for classification and passed through a magnet filter for deironation treatment. Finally, the slurry is dehydrated and kneaded in a vacuum pug mill. In this way there is obtained the desired synthetic porcelain clay.

Figure 3:
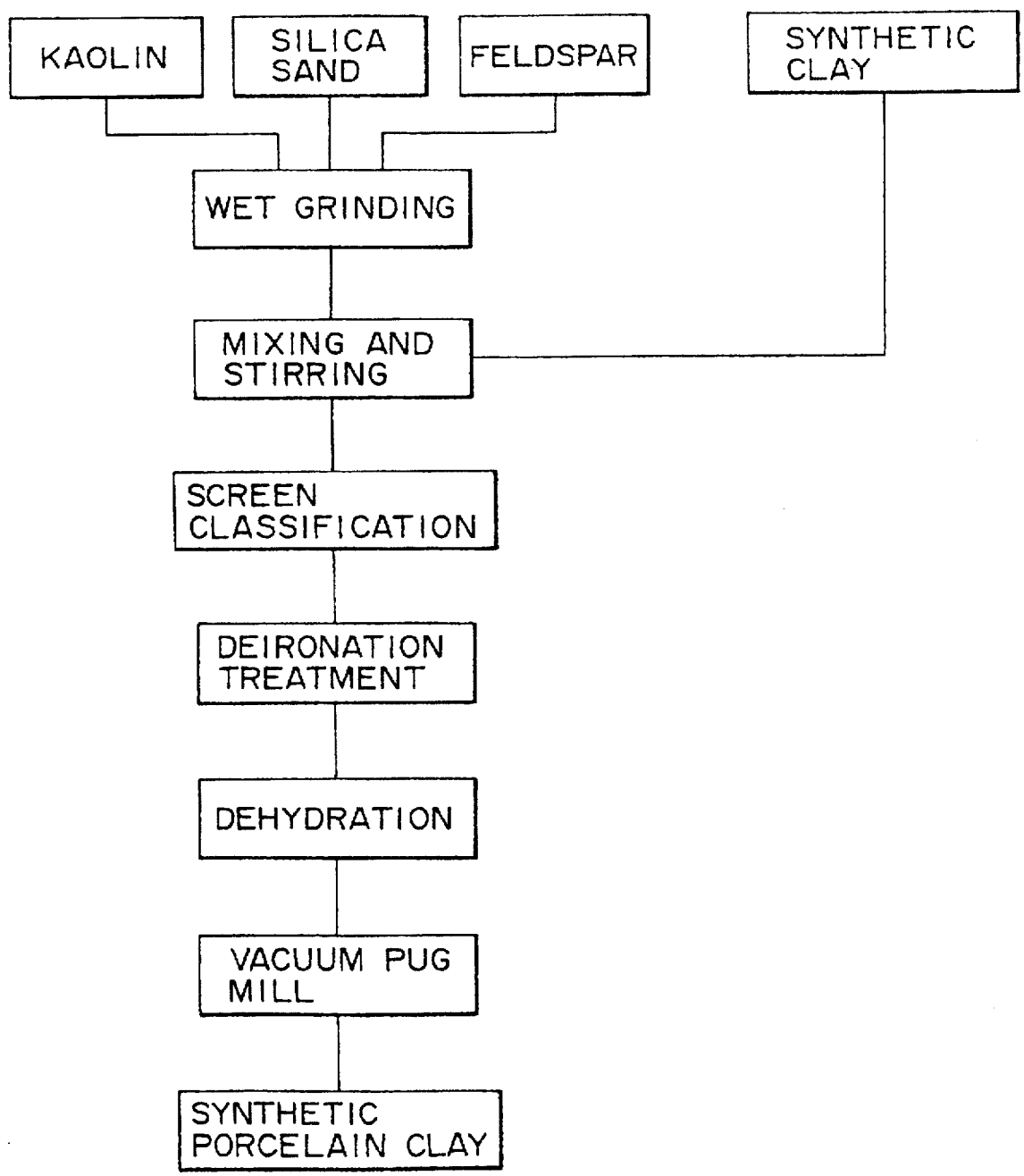
FIG. 3 is a block diagram showing a modification of the process shown in FIG. 2.

The above-mentioned process may be modified as shown in FIG. 3, in which kaolin is additionally incorporated into the raw material. Thus the raw material is composed of 10–20 wt % of kaolin, 30–35 wt % of silicastone, 10–25 wt % of feldspar, and 20–30 wt % (on dry basis) of the synthetic clay of the present invention. The ratio of the components should be properly adjusted according to the molding method employed and the pottery intended.

The invention will be described with reference to the following examples.

EXAMPLE 1

Fumed silica (35 wt %), aluminum hydroxide (60 wt %), and sepiolite (5 wt %) were separately pulverized by wet process in a ball mill to form respective slurries. The first two slurries were mixed together and the resulting slurry was mixed with the third slurry. Thus there was obtained a desired synthetic clay having an average particle diameter of 0.3 µm (designated as A). Incidentally, the slurry was incorporated with 0.1 wt % of dispersing agent during mixing and stirring.

EXAMPLE 2

The same procedure as in Example 1 was repeated to give a synthetic clay (B) having an average particle diameter of 0.2 µm, except that the raw material was composed of 30 wt % of fumed silica, 50 wt % of aluminum hydroxide, and 20 wt % of sepiolite.

EXPERIMENT 1

The synthetic clays A and B obtained as mentioned above were tested in the following manner for the flowability of slip (30% solids). For comparison, the same test was performed on New Zealand kaolin and Gaerome clay (which are natural clays).

(1) Each clay sample was peptized with 200–300% of water by ball-milling for 24 hours.
(2) The resulting dilute slip was concentrated (to 30% solids) by using a suction dehydrator.
(3) The concentrated slip was passed through a 150-mesh screen and then allowed to stand for 24 hours.
(4) The sample was measured for flowability at 12°–13° C. by using a digital viscometer (Model DV-B, made by Tohki Sangyo Co., Ltd.) equipped with a rotor No. 6W, rotating at 0.5, 1.0, 2.5, 5.0, 10, 20, 50, and 100 rpm. The results are shown in Table 3.

It is apparent from Table 3 that the synthetic clays A and B of the present invention are superior in flowability to natural clays. This result suggests that the synthetic clays are superior in plasticity to natural clays.

EXPERIMENT 2

The synthetic clays A and B were tested for dry flexural strength in the following manner. For comparison, the same test was performed on New Zealand kaolin and Gaerome clay.

(1) Each clay sample was peptized with 200–300% of water by ball-milling for 24 hours.
(2) The resulting dilute slip was concentrated by using a suction dehydrator such that the resulting clay samples had the same plasticity.
(3) The plastic clay was formed into a rod, 10 mm in diameter, under deaeration by using a vacuum extrusion press.
(4) The molded samples were suspended for natural drying in a closed chamber (to avoid deformation) and then completely dried at 100° C. in a thermostat.
(5) The dried samples were measured for dry flexural strength by three-point bending test according to JIS R1601, with the spun being 90 mm and the rate of load application being 1 g/sec. The results are shown in Table 3.

It is apparent from Table 3 that the synthetic clays A and B of the present invention are superior in dry flexural strength to natural clays. This result suggests that the synthetic clays exhibits a high green strength.

EXAMPLE 3

The same procedure as in Example 1 was repeated to form a synthetic clay having an average particle diameter of 0.25 μm, except that the raw material was composed of 41 wt % of fumed silica, 54 wt % of aluminum hydroxide, and 5 wt % of sepiolite. The resulting clay was mixed with a slurry prepared by wet ball-milling from silicastone and feldspar in a ratio of 40:25 by weight, so that the resulting mixture was composed of silicastone (45 wt %), feldspar (25 wt %), and the synthetic clay (35 wt % on dry basis). The mixture underwent screen classification, deironation, dehydration, and kneading by a vacuum pug mill. In this way there was obtained a sample of synthetic porcelain clay.

The sample was found to have a whiteness degree of 93.5 measured according to JIS L0803. It should be noted that this value is much higher than those (64.1–92.9) of natural porcelain clays.

The synthetic porcelain clay obtained as mentioned above was tested for flexural strength and water absorption according to JIS R1601 and JIS R2205, respectively. For comparison, the same test was performed on natural porcelain clays specified below.

Sample (1). silicastone (40 wt %), feldspar (25 wt %), and New Zealand kaolin (35 wt %).

Sample (2). silicastone (40 wt %), feldspar (25 wt %), and Gaerome clay (35 wt %).

The results are shown in Table 4. It is noted that the synthetic porcelain clay undergoes firing and vitrification more rapidly than the natural porcelain clays. This means that the former permits firing at a lower temperature and yields fired products having a higher strength as compared with the latter.

EXPLOITATION IN INDUSTRY

The synthetic clay of the present invention is superior in plasticity and other physical properties and suitable for pottery production. It will supersede high-quality natural clay which is running out.

TABLE 1

|  | Ignition loss | $SiO_2$ | $Al_2O_3$ | $Fe_2O_3$ | $TiO_2$ | CaO | MgO | $K_2O$ | $Na_2O$ |
|---|---|---|---|---|---|---|---|---|---|
| | | | | | | | | | (unit:wt %) |
| Fumed silica | 1.10 | 96.63 | 0.24 | 0.87 (0.30)* | trace | 0.07 | 0.38 | 0.47 | 0.23 |
| Aluminum hydroxide | 34.64 | — | 65.36 | — | — | — | — | — | — |
| Sepiolite | 11.62 | 58.57 | 2.98 | 0.61 | 0.09 | 0.86 | 24.77 | 0.73 | 0.78 |

*measured after passing through the magnet filter.

TABLE 2

|  | Ignition loss | $SiO_2$ | $Al_2O_3$ | $Fe_2O_3$ | $TiO_2$ | CaO | MgO | $K_2O$ | $Na_2O$ |
|---|---|---|---|---|---|---|---|---|---|
| | | | | | | | | | (unit:wt %) |
| Synthetic clay | 19.74 | 42.55 | 35.54 | 0.15 | trace | 0.07 | 1.40 | 0.23 | 0.13 |
| New Zealand kaolin | 14.68 | 46.36 | 38.53 | 0.25 | 0.08 | trace | trace | 0.03 | 0.04 |
| Gaerome clay | 12.33 | 51.22 | 31.29 | 1.80 | 1.10 | 0.08 | 0.64 | 1.16 | 0.02 |

TABLE 3

|  | Flowability of slip | | Dry flexural strength (gf/mm²) |
|---|---|---|---|
|  | at 50% shear stress (rpm) | at 100% shear stress (rpm) |  |
| Synthetic clay (A) | 16.8 | 18.2 | 194.3 |
| Synthetic clay (B) | 40.4 | 47.1 | 375.9 |
| New Zealand kaolin | 9.9 | 10.8 | 149.4 |
| Gaerome clay | 6.2 | 6.6 | 575.3 |

TABLE 4

|  | Flexural strength (kgf/cm²) Firing temperature (°C.) | | | Water absorption (%) Firing temperature (°C.) | | | |
|---|---|---|---|---|---|---|---|
|  | 1220 | 1280 | 1300 | 1200 | 1220 | 1280 | 1300 |
| Synthetic clay | 950 | 1010 | 1080 | 1.25 | 0.15 | 0.03 | 0.01 |
| New Zealand kaolin | 700 | 930 | 970 | 3.35 | 1.72 | 0.14 | 0.02 |
| Gaerome clay | 720 | 970 | 1060 | 2.57 | 1.12 | 0.10 | 0.02 |

We claim:

1. A synthetic clay for ceramics which comprises 30–65 wt % of amorphous silica, 30–65 wt % of alumina trihydrate, and 2–20 wt % of at least one material selected from the group consisting of sepiolite, palygorskite, and bentonite.

2. A synthetic clay for ceramics as defined in claim 1, wherein the amorphous silica is fumed silica.

3. A synthetic clay for ceramics as defined in claim 2, wherein the fumed silica is one which is in the form of spherical particles having an average diameter smaller than 0.2 μm.

4. A synthetic clay for ceramics as defined in claim 1, wherein the alumina trihydrate is aluminum hydroxide.

5. A synthetic clay for ceramics as defined in claim 1, which is composed of particles having an average diameter smaller than 0.4 μm.

6. A synthetic clay for ceramics which comprises 30–65 wt % of fumed silica, 30–65 wt % of aluminum hydroxide, and 2–20 wt % of sepiolite.

7. A synthetic clay for ceramics as defined in claim 6, which is composed of particles having an average diameter smaller than 0.4 μm.

8. A process for producing a synthetic clay for ceramics, comprising preparing slurries from raw materials of amorphous silica, alumina trihydrate and at least one material selected from the group consisting of sepiolite, palygorskite and bentonite by wet milling, and mixing the resulting slurries to contain, excluding water, 30–65 wt % of the amorphous silica, 30–65 wt % of the alumina trihydrate, and 2–20 wt % of the at least one material selected from the group consisting of sepiolite, palygorskite and bentonite.

9. A process for producing a synthetic clay for ceramics as defined in claim 8, further comprising partially dehydrating the mixture of the slurries, thereby producing a water-containing clay.

10. A process for producing a synthetic clay for ceramics as defined in claim 8, further comprising partially dehydrating the mixture of the slurries thereby to produce a water-containing clay, and finally drying the water-containing clay thereby to produce a mass or dry powder of clay.

* * * * *